US007636332B2

(12) United States Patent
Kwak et al.

(10) Patent No.: US 7,636,332 B2
(45) Date of Patent: Dec. 22, 2009

(54) METHOD AND APPARATUS FOR INDICATING CELL SELECTION WHEN A SESSION IS STOPPED IN A MULTIMEDIA BROADCAST/MULTICAST SERVICE SYSTEM

(75) Inventors: No-Jun Kwak, Seoul (KR); Kyeong-In Jeong, Suwon-si (KR); Kook-Heui Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 633 days.

(21) Appl. No.: 11/225,008

(22) Filed: Sep. 14, 2005

(65) Prior Publication Data

US 2006/0056347 A1 Mar. 16, 2006

(30) Foreign Application Priority Data

Sep. 14, 2004 (KR) ..................... 10-2004-0073574
Sep. 25, 2004 (KR) ..................... 10-2004-0077582

(51) Int. Cl.
*H04L 12/28* (2006.01)

(52) U.S. Cl. ....................... 370/329; 370/343; 370/390; 370/312; 370/347; 455/435.2; 455/437; 455/443; 455/447

(58) Field of Classification Search ................. 370/343, 370/432, 329, 390, 312, 347; 455/506, 504, 455/518, 432.1, 446, 452.1, 452.2, 453, 448, 455/447, 435.2, 435.3, 443, 437
See application file for complete search history.

(56) References Cited

U.S. PATENT DOCUMENTS 6,223,037 B1 * 4/2001 Parkkila ..................... 455/434

(Continued)

FOREIGN PATENT DOCUMENTS

EP 1 420 604 5/2004

(Continued)

OTHER PUBLICATIONS

Universal Mobile Telecommunications Systems (UMTS); Introduction of Multimedia Broadcast/Multicast Service (MBMS) in the Radio Access Network (RAN), Stage 2, (3GPP TS 25.346 version 6.1.0 Release 6), XP-014016838 ETSI TS 125 346 V.6.1.0 (Jun. 2004).

(Continued)

*Primary Examiner*—George Eng
*Assistant Examiner*—Brandon J Miller
(74) *Attorney, Agent, or Firm*—Roylance, Abrams, Berdo & Goodman, L.L.P.

(57) ABSTRACT

A multimedia broadcast/multicast service (MBMS) service and a method and apparatus for maintaining congestion and a signal transfer load of a cell at a suitable level when a session of the MBMS service is terminated in a frequency layer convergence (FLC) situation in which the MBMS service is provided in a preferred frequency layer (PL). When a session of the MBMS service is terminated, a radio network controller (RNC) determines if a cell selection is required in UEs, desiring to receive the MBMS service located in the PL cell, by using a start time of a new session and load levels of a current cell and other cells, and sends, to the UEs, explicit cell selection indication information along with session stop information according to a determination result. Therefore, the congestion and signal transfer load of the cell can be maintained in the suitable level.

4 Claims, 15 Drawing Sheets

U.S. PATENT DOCUMENTS 6,349,206 B1 2/2002 Reichelt et al.
7,436,811 B2 * 10/2008 Putcha et al. ............... 370/343
2002/0111166 A1 * 8/2002 Monroe ...................... 455/435
2003/0100325 A1 5/2003 Paila et al.
2005/0090278 A1 4/2005 Jeong et al.
2005/0118992 A1 6/2005 Jeong et al.
2005/0232292 A1 * 10/2005 Richards et al. ............. 370/432
2005/0245260 A1 * 11/2005 Nielsen et al. ........... 455/435.1
2005/0281270 A1 * 12/2005 Kossi et al. .............. 370/395.5
2007/0053336 A1 * 3/2007 Petrovic et al. ............. 370/343

FOREIGN PATENT DOCUMENTS

WO WO 2004-045165 5/2004

OTHER PUBLICATIONS

Universal Mobile Telecommunications Systems (UMTS); Introduction of Multimedia Broadcast/Multicast Service (MBMS) in the Radio Access Network (RAN), Stage 2, (3GPP TS 25.346 version 6.2.0 Release 6), XP-014016838 ETSI TS 125 346 V.6.2.0 (Sep. 2004).

* cited by examiner

| Information Element/Group name | Need | Multi | Type and reference | Semantics description |
|---|---|---|---|---|
| Session stopped service list | | <1.. Max No Stopped Serv Per Cell> | | List of stopped MBMS services per cell |
| > TMGI | MP | | TMGI | MBMS service id |
| > Session ID | OP | | | MBMS session id |
| > cell selection indicator | | | | |
| >> Indicator | MP | | Boolean | True if selection is required. False if selection is not required. |
| >> Probability factor | MP | | ENUMERATED (0..Max Resolution) | Selection probability = PF/MaxResolution |

FIG.6

| Information Element/Group name | Need | Multi | Type and reference | Semantics description |
|---|---|---|---|---|
| Message Type | MP | | Message Type | |
| UE information elements | | | | |
| RRC transaction identifier | MP | | RRC transaction identifier | |
| TMGI | MP | | TMGI | MBMS service id |
| Session ID | OP | | | Session ID |
| cell selection indicator | | | | |
| > Indicator | MP | | Boolean | True if selection is required. False if selection is not required. |
| > Probability factor | MP | | ENUMERATED (0..Max Resolution) | Selection probability = PF/MaxResolution |

FIG.10

| Information Element/Group name | Need | Multi | Type and reference | Semantics description |
|---|---|---|---|---|
| Message Type | MP | | Message Type | |
| UE information elements | | | | |
| RRC transaction identifier | MP | | RRC transaction identifier | |
| TMGI | MP | | TMGI | MBMS service id |
| Session ID | OP | | | Session ID |

FIG.12

METHOD AND APPARATUS FOR INDICATING CELL SELECTION WHEN A SESSION IS STOPPED IN A MULTIMEDIA BROADCAST/MULTICAST SERVICE SYSTEM

PRIORITY

This application claims the benefit under 35 U.S.C. § 119 (a) of two Korean Patent Applications entitled "Method and Apparatus for Indicating Cell Selection When a Session is Stopped in a Multimedia Broadcast/Multicast Service System" filed in the Korean Intellectual Property Office on Sep. 14, 2004 and Sep. 25, 2004 and assigned Serial Nos. 2004-73574 and 2004-77582 respectively, the entire contents of both of which are hereby incorporated by reference.

BACKGROUND OF THE INVENTION

1. Field of the Invention

The present invention generally relates to a multimedia broadcast/multicast service (MBMS). More particularly, the present invention relates to a method and apparatus for maintaining congestion and a signal transfer load of a cell at a suitable level when a session of a MBMS service is stopped in a frequency layer convergence (FLC) situation in which the MBMS service is provided in a preferred frequency layer (PL).

2. Description of the Related Art

Currently, mobile communication systems using a wideband code division multiple access (W-CDMA) scheme are actively being pursued for use in systems for multimedia broadcast/communication capable of providing not only a conventional voice service, but also a multimedia service and a packet communication service for transmitting large amounts of data. To support the multimedia broadcast/communication, a multimedia broadcast/multicast service (MBMS) service capable of being provided from one or more multimedia data sources to a plurality of user equipments (UEs) is being discussed.

The term "MBMS service" indicates a service for transmitting the same multimedia data to a plurality of receivers through a wireless network. In this case, radio transmission resources can be efficiently used because the receivers share one radio channel. This type of MBMS service supports the transmission of multimedia such as realtime video and voice, still images, text, and so on, serves as a service capable of simultaneously transmitting voice data and video data according to a type of the multimedia transmission, and requires a large amount of resources for transmission. Because a MBMS service must transmit the same data to a plurality of cells in which users are located, a Point-to-Point (PP) or Point-to-Multipoint (PM) connection is made according to the number of users located in each cell.

FIG. 1 schematically illustrates nodes joining a MBMS service in a mobile communication network. In FIG. 1, an example of a structure is illustrated in which the MBMS service is applied to the third-generation project partnership (3GPP) system corresponding to the 3G asynchronous mobile communication standard, which is incorporated by reference, based on a global system for mobile communications (GSM) and general packet radio services (GPRS).

Referring to FIG. 1, UEs 161, 162, 163, 171, and 172 represent terminal devices and subscribers capable of receiving the MBMS service. Cell-1 160 and Cell-2 170 are physical or logical service areas covered by base stations, that is, Node Bs, for transmitting MBMS data to the subscribers wirelessly. A radio network controller (RNC) 140 controls the cells 160 and 170, selectively transmits multimedia data to a specific cell, and controls a radio channel established to provide MBMS services. A connection between the RNC 140 and the UEs 161 to 172 is achieved by a radio resource control (RRC) interface.

The RNC 140 is connected to a packet switched or packet service (PS) network such as the Internet and so on by a serving GPRS support node (SGSN) 130. Communication between the RNC 140 and the PS network is achieved by packet switched (PS) signaling. Specifically, a connection between the RNC 140 and the SGSN 130 is referred to as an Iu-PS interface. The SGSN 130 controls a MBMS service for subscribers. For example, the SGSN 130 is responsible for managing data relating to service charges for each subscriber and selectively transmitting multimedia data to the specific RNC 140.

A transit network (NW) 120 provides a communication path between a broadcast/multicast-service center (BM-SC) 110 and the SGSN 130, and can be connected to an external network through a gateway GPRS support node (GGSN) (not illustrated). The BM-SC 110 serves as a MBMS data source and is responsible for scheduling the MBMS data.

On the other hand, the RNC 140 is connected to a circuit switched (CS) network by a mobile switching center (MSC) 150. The CS network is a legacy communication network for voice that is connection oriented. Communication between the RNC 140 and the MSC 150 is achieved by CS signaling. Specifically, a connection between the RNC 140 and the MSC 150 is referred to as an Iu-CS interface.

A MBMS data stream generated from the BM-SC 110 arrives at the UEs 161, 162, 163, 171, and 172 through the transit network 120, the SGSN 130, the RNC 140, and the cells 160 and 170.

Although not illustrated in FIG. 1, a plurality of SGSNs for one MBMS service and a plurality of RNCs for each SGSN can be provided. Each SGSN transmits selective data to the RNCs, and each RNC transmits selective data to the cells. For this, nodes store a list of low-level nodes to which a data stream is transferred. That is, the SGSN stores a list of RNCs and the RNC is a list of cells. Then, the nodes transmit selective MBMS data to the stored listed nodes.

FIG. 2 illustrates a procedure between a subscriber terminal and a network for a MBMS service. A BM-SC 206 communicates with a UE 202 through a RNC 204. The RNC 204 communicates with the BM-SC 206 through a SGSN (not illustrated). Here, one RNC 204 and one UE 202 are only illustrated. Of course, the same procedure can be applied to a plurality of UEs receiving the MBMS service and a plurality of RNCs for controlling the UEs.

Referring to FIG. 2, a service subscription step 210 is a process for registering the user, such as the UE 202, desiring to receive the MBMS service in the BM-SC 206 serving as a service provider. In the service subscription step 210, the service provider (BM-SC) 206 and the UE 202 exchange basic information associated with service charges or service reception.

In a service announcement step 220, UEs identify basic information for MBMS services. For example, the UEs identify MBMS service identifiers (IDs), service start times, service durations, and so on to distinguish the MBMS services capable of being provided from the BM-SC 206. Here, the MBMS service ID can be configured by a multicast address and an access point node (APN).

In the service announcement step 220, nodes located between the BM-SC 206 and the UE 202, such as the RNC 204, the SGSN, the transit network, and so on, identify the UE 202 and nodes coupled to the UE 202. For example, the SGSN identifies a list of low-level UEs desiring to receive the MBMS service and a list of low-level RNCs at which UEs are located. The SGSN refers to the lists and then transmits MBMS data only to the RNCs at which the UEs are located.

When obtaining basic information for the MBMS service, the UE 202 performs a service joining step 230 to receive MBMS service data of interest. In the service joining step 230, the UE 202 transfers, to the BM-SC 206, at least one desired MBMS service ID of MBMS service IDs obtained through the service announcement step 220.

A service notification step 240 refers to paging the UE 202 to notify the UE 202 that a session of a MBMS service joined by the UE 202 has begun started and the MBMS service will soon be started. In the service notification step 240, group paging is performed for a plurality of UEs joining the MBMS service.

A radio resource allocation step 250 refers to allocating radio resources between the UE 202 and the RNC 204 and notifying relative nodes of allocation information to provide the MBMS service. In step 250, the RNC 204 can determine the PM or PP connection on the basis of information about the number of UEs belonging to each low-level cell and a radio resource management (RRM) function.

In data transfer step 260, MBMS data is transferred to the UE 202 through the RNC 204. When information associated with the MBMS service, for example a ciphering key, needs to be changed while the MBMS data is transmitted, the RNC 204 includes new information associated with the MBMS service in MBMS control information and transfers the MBMS control information to all UEs receiving the MBMS service.

When the session of the MBMS service is stopped or terminated, the allocated radio resources are released in a radio resource release step 270 and the UE 202 is notified that the MBMS radio resources have been released. While the MBMS service is received in step 250, the UE 202 can voluntarily request reception termination of the MBMS service and can stop reception of the MBMS service.

Recent MBMS systems are supporting FLC technology for allocating a preferred frequency layer (PL) for each of the MBMS services capable of being provided and allowing UEs to receive desired MBMS services in the PL if possible. PL information indicates PLs mapped to MBMS services.

FIG. 3 illustrates an example of a cell structure in a FLC situation in a MBMS system. Under a Node B 300, three cells 301, 302, and 303 using different frequencies (Frequencies 1 through 3) spatially overlap with each other. In the cells 301 through 303, UEs 311, 312, 313 and 314 use the MBMS service in a cell on which they are camped. Frequency Layer 2 mapped to Cell-2 302 of the cells 301 to 303 is established as a PL for the MBMS service.

When a session of the MBMS service is stopped in the FLC situation as illustrated in FIG. 3, the UEs receiving the MBMS service in the PL may stay in a PL cell (in other words, Cell 2 of FIG. 3) through a cell reselection process without dispersing to other cells (in other words, non-PL (NPL) cells). In this case, because the UEs wait for a new session that may or may not start for a long time although MBMS transmission is not present on a radio link, the PL cell becomes very congested as compared with other cells and quality of service becomes degraded.

If the NPL cells have already been congested when the UEs disperse to the NPL cells due to the session stop, there is a problem in that the congestion of the NPL cells becomes worse due to the dispersion of the UEs and therefore significant intercell load may occur.

SUMMARY OF THE INVENTION

Accordingly, the present invention has been designed to solve the above and other problems occurring in the prior art. Therefore, the present invention provides a method and apparatus for explicitly notifying user equipments (UEs) if cell selection is required in a radio network controller (RNC) after determining a start time of a new session and load levels of its cells and other cells when a multimedia broadcast/multicast service (MBMS) service is stopped.

Moreover, an exemplary embodiment of the present invention provides a method and apparatus for including a probability value in indication information when the indication information indicating if a dispersion operation of user equipments (UEs) is required is transferred, and allowing the UEs to perform cell selection according to the probability.

Moreover, an exemplary embodiment of the present invention provides a method and apparatus for independently starting a timer in a user equipment (UE) when a session is stopped and performing cell reselection if the next session is not started until a predetermined time expires.

In accordance with an exemplary aspect of the present invention, a method is provided for providing indication for a multimedia broadcast/multicast service (MBMS) service in a mobile communication system using a preferred frequency layer (PL) cell and a non-preferred frequency layer (NPL) cell for the MBMS service. The method comprises the steps of determining whether to disperse user equipments (UEs), desiring to receive the MBMS service, from the PL cell of the MBMS service when a session of the MBMS service is stopped, and transmitting cell selection indication information based on a result of the determining step to the UEs receiving the MBMS service along with session stop information of the MBMS service.

In accordance with another exemplary aspect of the present invention, a method is provided for receiving a multimedia broadcast/multicast service (MBMS) service in a user equipment (UE) of a mobile communication system using a preferred frequency layer (PL) cell and a non-preferred frequency layer (NPL) cell for the MBMS service. The method comprises the steps of receiving session stop information indicating that a session of a MBMS service has been stopped, receiving cell selection indication information indicating if dispersion from the PL cell of the MBMS service is required after the session of the MBMS service has been stopped, and performing cell selection or staying in a current cell according to the cell selection indication information.

In accordance with another exemplary aspect of the present invention, a mobile communication system using a preferred frequency layer (PL) cell and a non-preferred frequency layer (NPL) cell for a multimedia broadcast/multicast service (MBMS) service is provided. The mobile communication system comprises a radio network controller (RNC) for determining whether to disperse user equipments (UEs), desiring to receive the MBMS service, from the PL cell of the MBMS service when a session of the MBMS service is stopped, and transmitting cell selection indication information to the UEs receiving the MBMS service according to a determination result, and the UEs for receiving the cell selection indication information and performing cell selection or staying in a current cell according to the cell selection indication information.

In accordance with yet another exemplary aspect of the present invention, a method is provided for receiving a multimedia broadcast/multicast service (MBMS) service in a user equipment (UE) of a mobile communication system using a preferred frequency layer (PL) cell and a non-preferred frequency layer (NPL) cell for the MBMS service. The method comprises the steps of receiving session stop information indicating that a session of the MBMS service has been stopped, starting a predetermined timer after the session of the MBMS service has been stopped, continuously receiving the MBMS service in a current cell when a new session of the MBMS service is started before the timer times out, and performing cell reselection when a new session of the MBMS service is not started until the timer expires.

BRIEF DESCRIPTION OF THE DRAWINGS

The above and other exemplary aspects and advantages of the present invention will be more clearly understood from the following detailed description taken in conjunction with the accompanying drawings, in which:

FIG. 6 is an exemplary table illustrating a structure of cell selection indication information in accordance with an exemplary embodiment of the present invention;

FIG. 10 is an exemplary table illustrating an example of a structure of a cell selection indication message in accordance with an exemplary embodiment of the present invention;

FIG. 12 is an exemplary table illustrating an example of another structure of a cell selection indication message in accordance with an exemplary embodiment of the present invention;

Throughout the drawings, like reference numerals will be understood to refer to like parts, components and structures.

DETAILED DESCRIPTION OF EXEMPLARY EMBODIMENTS

Exemplary embodiments of the present invention will be described in detail herein below with reference to the accompanying drawings. In the following description, detailed descriptions of functions and configurations incorporated herein that are well known to those skilled in the art are omitted for clarity and conciseness. It is to be understood that the phraseology and terminology employed herein are for the purpose of description and should not be regarded as limiting the present invention.

In accordance with an exemplary embodiment of the present invention, a radio network controller (RNC) can send, to user equipments (UEs) using a multimedia broadcast/multicast service (MBMS) service, explicit indication information indicating if they need to move from a preferred frequency layer (PL) of the MBMS service to another frequency layer when the MBMS service is stopped.

Figure 1:
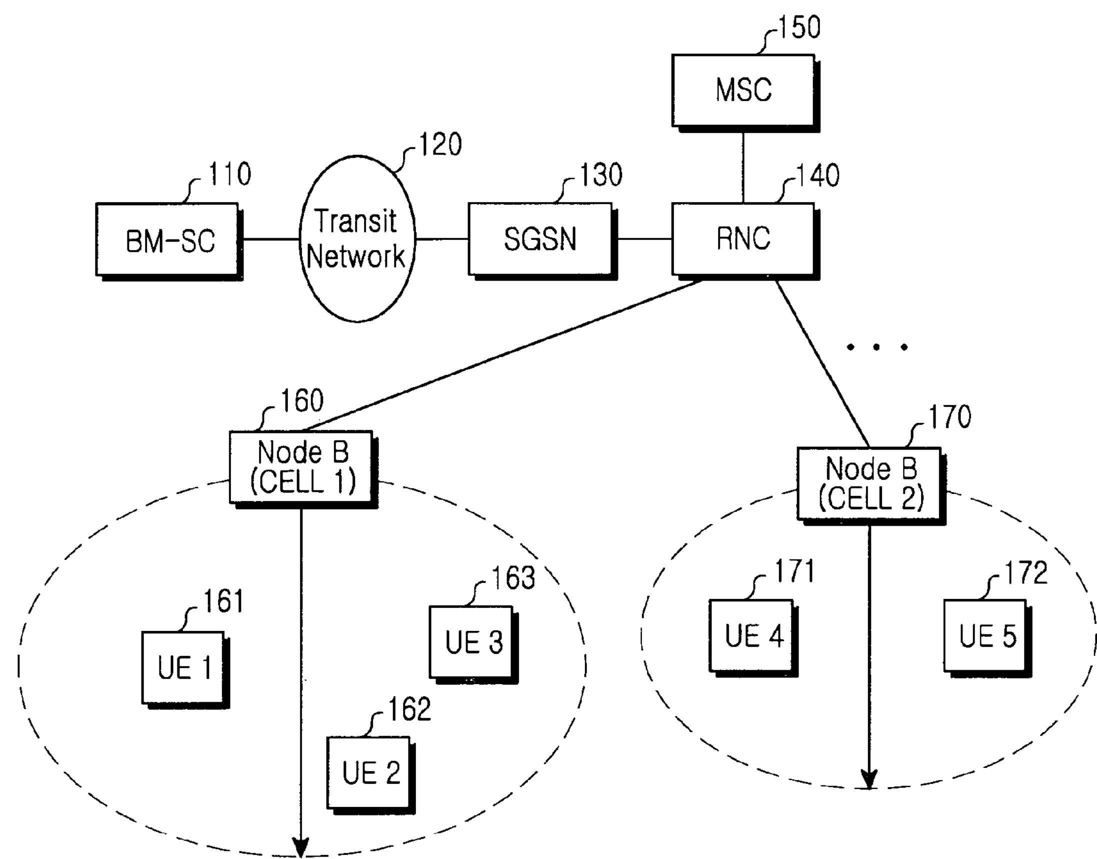
FIG. 1 is a block diagram illustrating a structure of a network for providing a multimedia broadcast/multicast service (MBMS) service.
Figure 2:
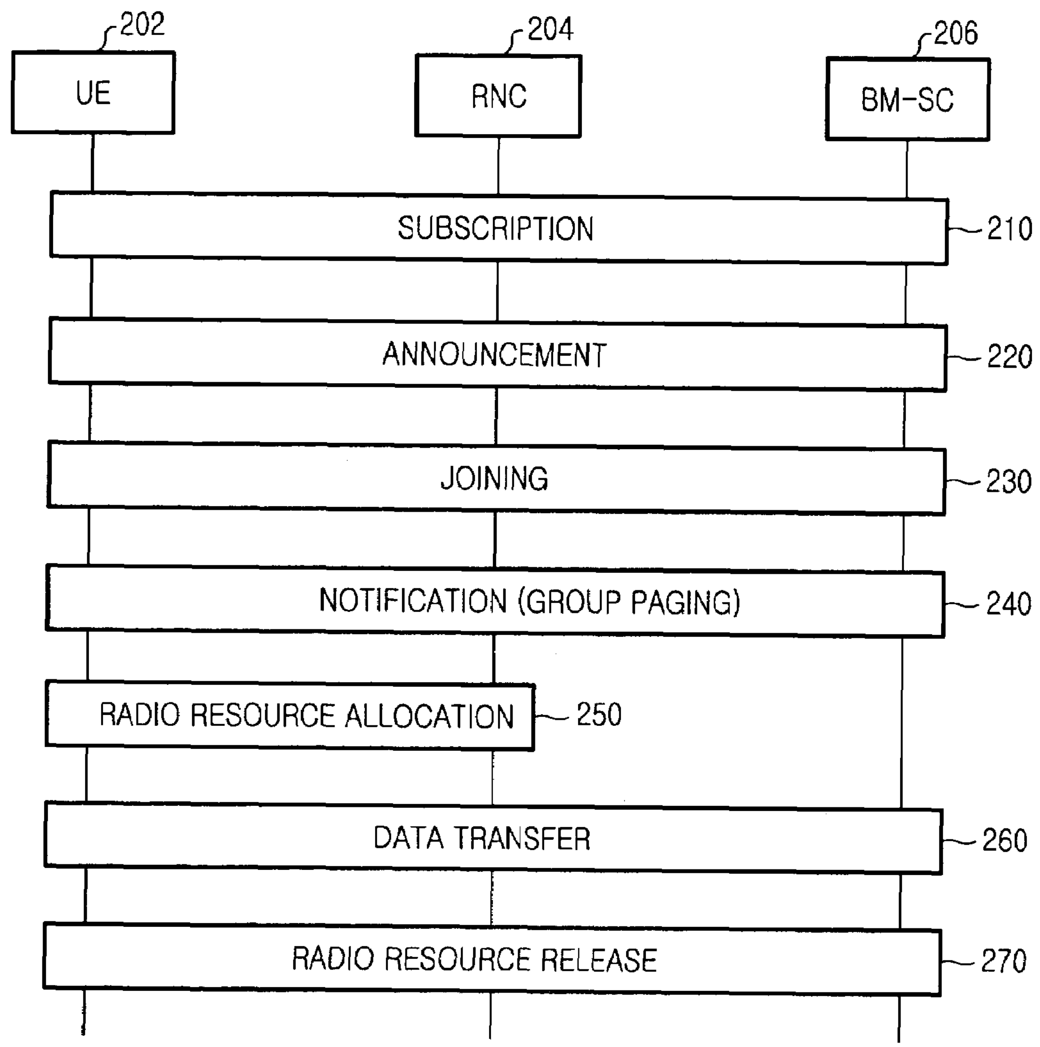
FIG. 2 is a flow diagram illustrating a procedure for providing a MBMS service.
Figure 3:
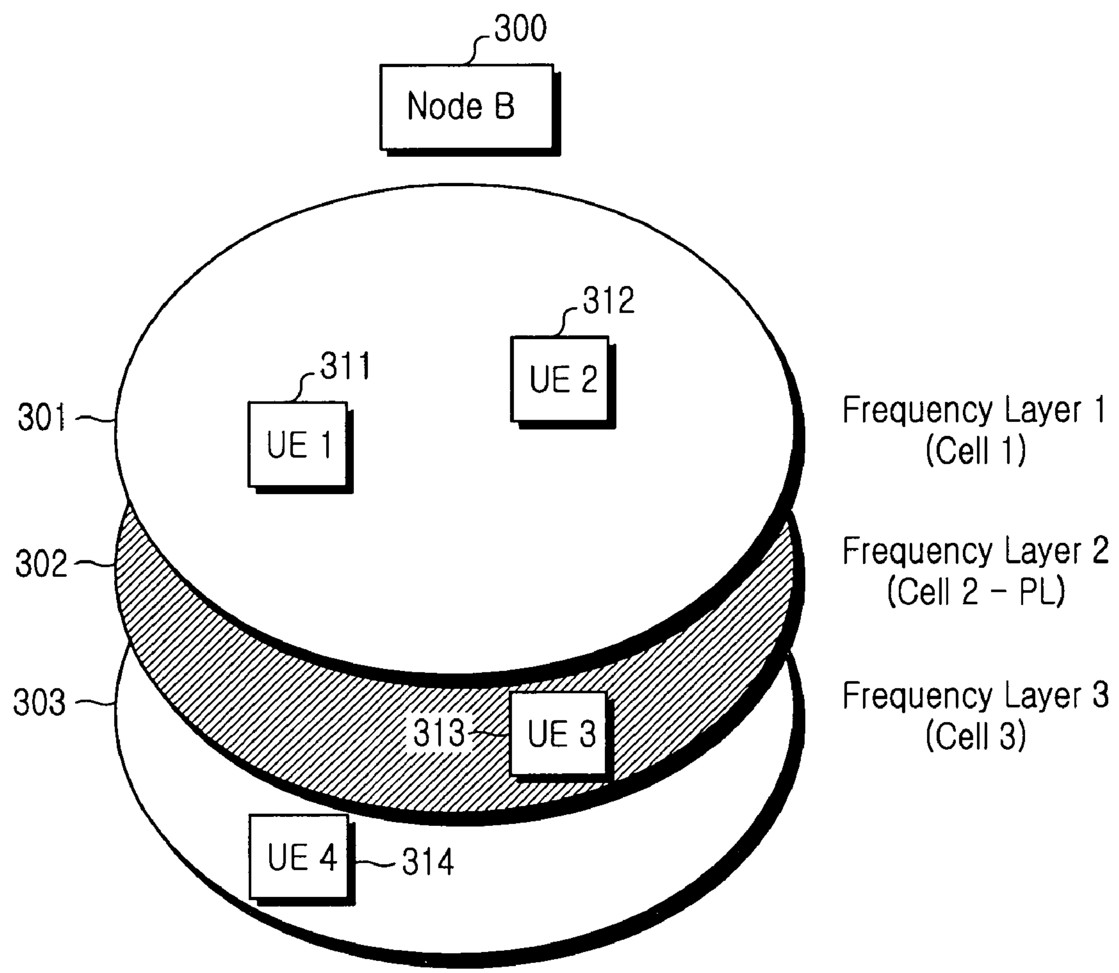
FIG. 3 illustrates a cell state in a frequency layer convergence (FLC) situation.
Figure 4:
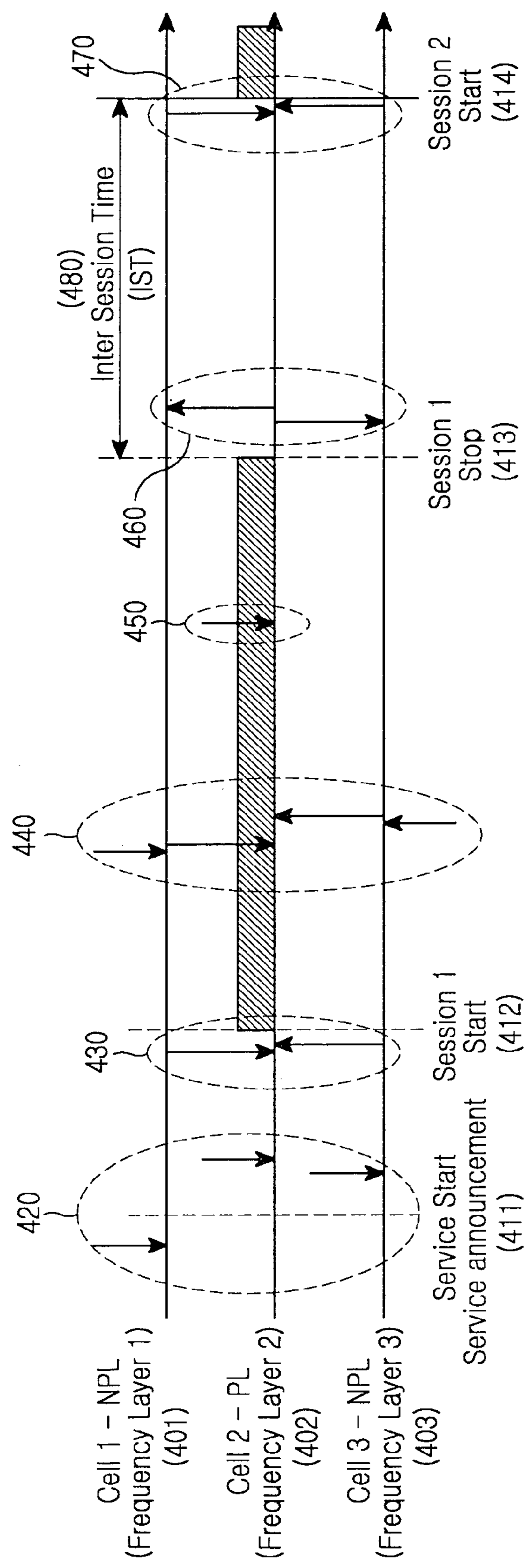
FIG. 4 illustrates an exemplary state of each cell according to a flow of time in the FLC situation according to an exemplary embodiment of the present invention.

FIG. 4 illustrates state variations of each cell for providing a MBMS service according to time in a frequency layer convergence (FLC) situation in accordance with an exemplary embodiment of the present invention. Here, Cell-2 402 of cells 401 through 403 comprise a PL of a MBMS service, and "↑" and "↓" indicate UE states.

FIG. 4 will now be described. At a time point 411, a Node B indicates UEs the beginning of the MBMS service through service announcement. The first session (Session 1) is started in Cell-2 402 at a time point 412. Session 1 is stopped at a time point 413. After an inter session time (IST) 480 elapses from the time point 413, the second session (Session 2) of the MBMS service is started in Cell-2 402 at time point 414. Start and stop information of the sessions is transferred to UEs located in all the cells 401 through 403 through a MBMS control channel (MCCH) carrying MBMS control information.

As indicated by reference numeral 420, the UEs join a MBMS service of interest before sessions are started. That is, the UEs join the MBMS service of interest in their cells before or after the MBMS service is started.

As indicated by reference numeral 430, the UEs receive PL information through the MCCH immediately before Session 1 is started, detect that Session 1 will soon be started, and move to Cell-2 402 using a PL for the MBMS service of Session 1.

As indicated by reference numeral 440, the UEs desiring to receive the MBMS service move from the cells 401 and 403 of different frequency layers rather than the PL to Cell-2 402 of the PL after Session 1 is started. As indicated by reference numeral 450, a UE located in Cell-2 402 corresponding to the PL can begin to receive the MBMS service in Cell-2 while Session 1 is in progress.

As indicated by reference numeral 460, the UEs detect that Session 1 has been stopped through the MCCH and disperse to another cell 401 or 403 through a cell selection process to reduce the congestion of Cell-2 402 using the PL. As indicated by reference numeral 470 similar to reference numeral 430, the UEs detect that Session 2 will soon be started, and again gather around Cell-2 402 using the PL for the MBMS service. In this case, if Session 2 is started in a relatively short time, for example, the IST is less than or equal to a predetermined threshold value, the UEs stay in Cell-2 402 without dispersing to another cell 401 or 403.

For the above-described operation, an exemplary embodiment of the present invention uses cell selection indication information for indicating if the UEs using the MBMS service need to disperse to other cells (in other words, non-PL (NPL) cells) through cell selection when the session of the MBMS service has been stopped. The cell selection indication information is sent through the MCCH carrying control information associated with MBMS services in accordance with an exemplary embodiment or is sent through a radio resource control (RRC) message in accordance with the second exemplary embodiment. Hereinafter, exemplary embodiments of the present invention will be described in greater detail.

Figure 5:
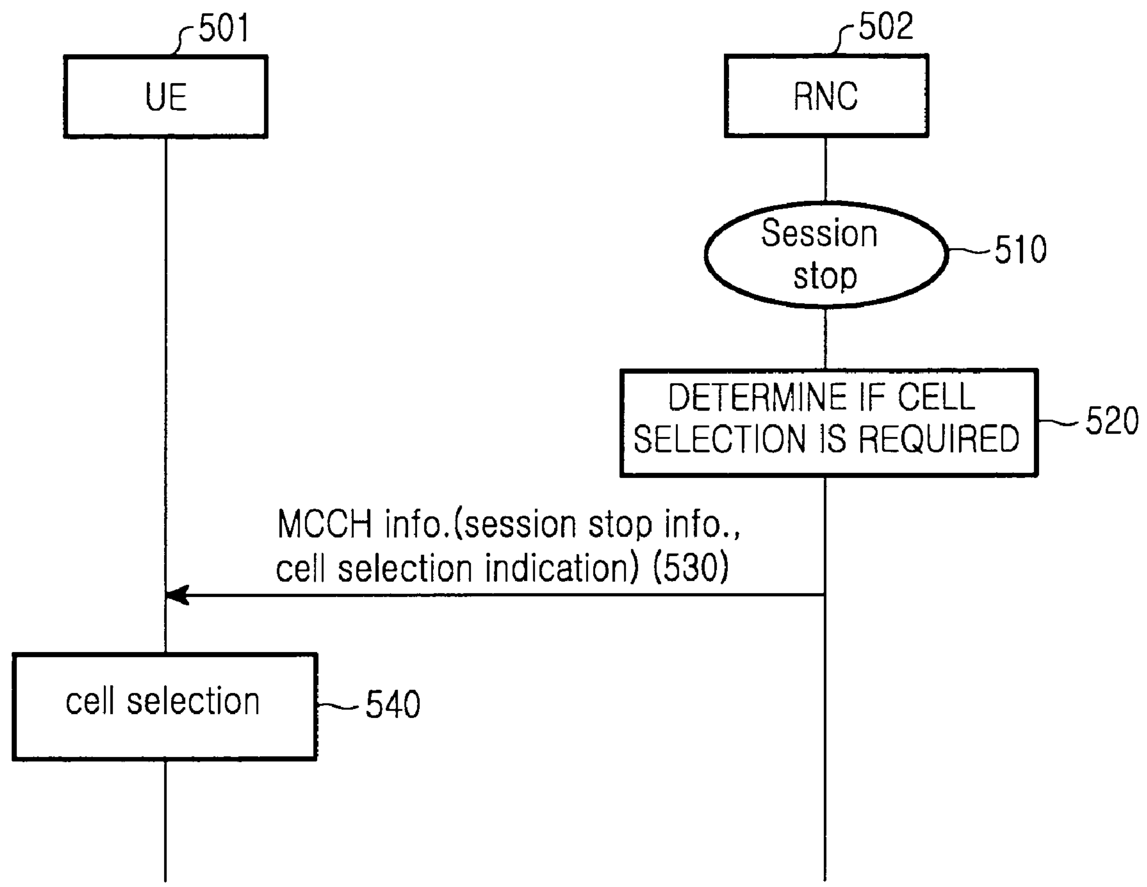
FIG. 5 is an exemplary message flow diagram illustrating a dispersion operation of a user equipment (UE) using a MBMS control channel (MCCH) in accordance with an exemplary embodiment of the present invention.

FIG. 5 is an exemplary message flow diagram illustrating a dispersion operation of a UE using the MCCH in accordance with an exemplary embodiment of the present invention.

Referring to FIG. 5, a RNC 502 receives a session stop message of a MBMS service from a serving GPRS support node (SGSN) (not illustrated) in step 510 and determines if cell selection is required in UEs using or desiring to use the MBMS service in step 520. At this time, the RNC 502 determines a time taken until the next session of the MBMS service is started and load levels of PL and NPL cells, and determines if the cell selection is required.

In step 530, the RNC 502 transmits session stop information for notifying a UE 501 that the session of the MBMS service has been stopped via the MCCH. Moreover, the RNC 502 comprises information indicating if cell selection is required (in other words, cell selection indication information) in MBMS control information, such as MCCH information, and sends the MCCH information through the MCCH. In step 540, the UE 501 receiving the MCCH information performs the cell selection or stays in the current cell according to the cell selection indication information. At this time, when the cell selection is performed, the UE 501 returns to a frequency cell where it was located in before moving to a PL cell of the MBMS service or performs the cell selection on the basis of a measurement result obtained by measuring the intensity of a signal. To accomplish this, whenever the UE 501 receiving the MBMS service moves between cells, it stores previous frequency information representing a previous frequency cell and returns to the previous frequency cell on the basis of the previous frequency information when indication for dispersion from the PL cell is received according to a MBMS service stop.

FIG. 6 is an exemplary table illustrating a structure of cell selection indication information comprised in the MCCH information in accordance with an exemplary embodiment of the present invention.

The MCCH information is repeatedly transmitted during a predetermined modification period. Multiple MBMS services in which sessions have been stopped before the current modification period may be present in one cell. A session stopped service list of FIG. 6 comprises the MBMS services in which the sessions have been stopped before the current modification period. The session stopped service list comprises a MBMS service identifier (ID) and a cell selection indicator. The MBMS service ID can use a temporary MBMS group identifier (TMGI), and can further comprise a session ID. Moreover, the session stopped service list can further comprise the session ID for identifying a stopped session for each MBMS service.

The cell selection indicator indicates if the cell selection is required for each MBMS service. For example, the cell selection indication information can comprise an indicator or probability factor (PF). The indicator indicates a Boolean value. In this case, “1” indicates that the cell selection is required in UEs receiving the cell selection indication information, and “0” indicates that the cell selection is not required. The PF is set to an integer n between 0 and a predefined maximum resolution (MaxResolution) value. In this case, the UEs perform cell selection according to the probability of n/MaxResolution.

Figure 7:
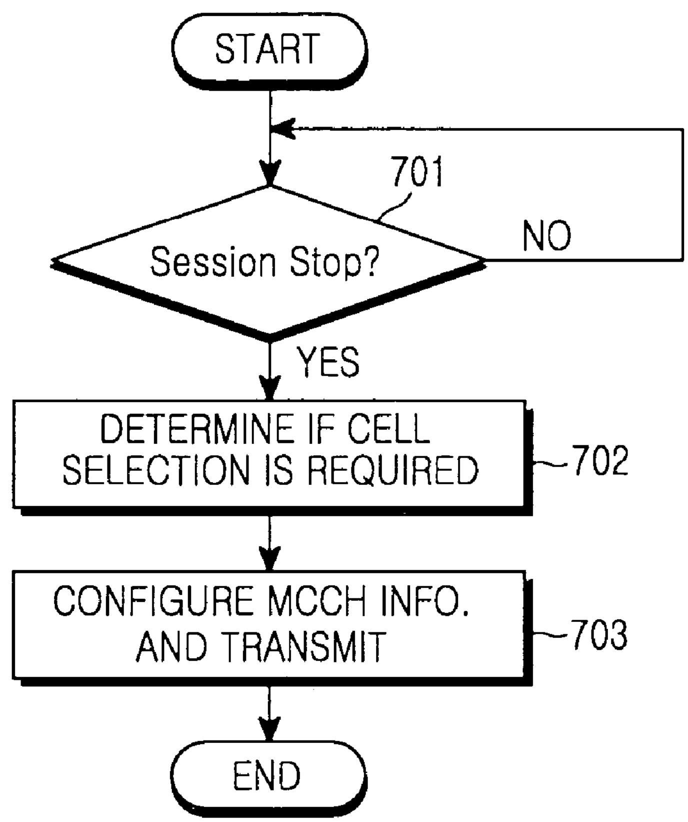
FIG. 7 is an exemplary flowchart illustrating an operation for transmitting the cell selection indication information from a radio network controller (RNC) in accordance with an exemplary embodiment of the present invention.

FIG. 7 is an exemplary flowchart illustrating an operation for transmitting the cell selection indication information from the RNC in accordance with an exemplary embodiment of the present invention.

Referring to FIG. 7, the RNC receives a session stop message for a MBMS service from the SGSN in step 701 and determines if cell selection is required in UEs using the MBMS service in step 702. Here, the MBMS service has an allocated preferred frequency. In step 703, the RNC adds session stop information and cell selection indication information to MCCH information, sends the MCCH information to the UEs using the MBMS service through the MCCH, and stops the MBMS service. The cell selection indication information indicates if cell selection is required in the UEs using the MBMS service, in other words, a dispersion operation is required in the UEs.

Figure 8:
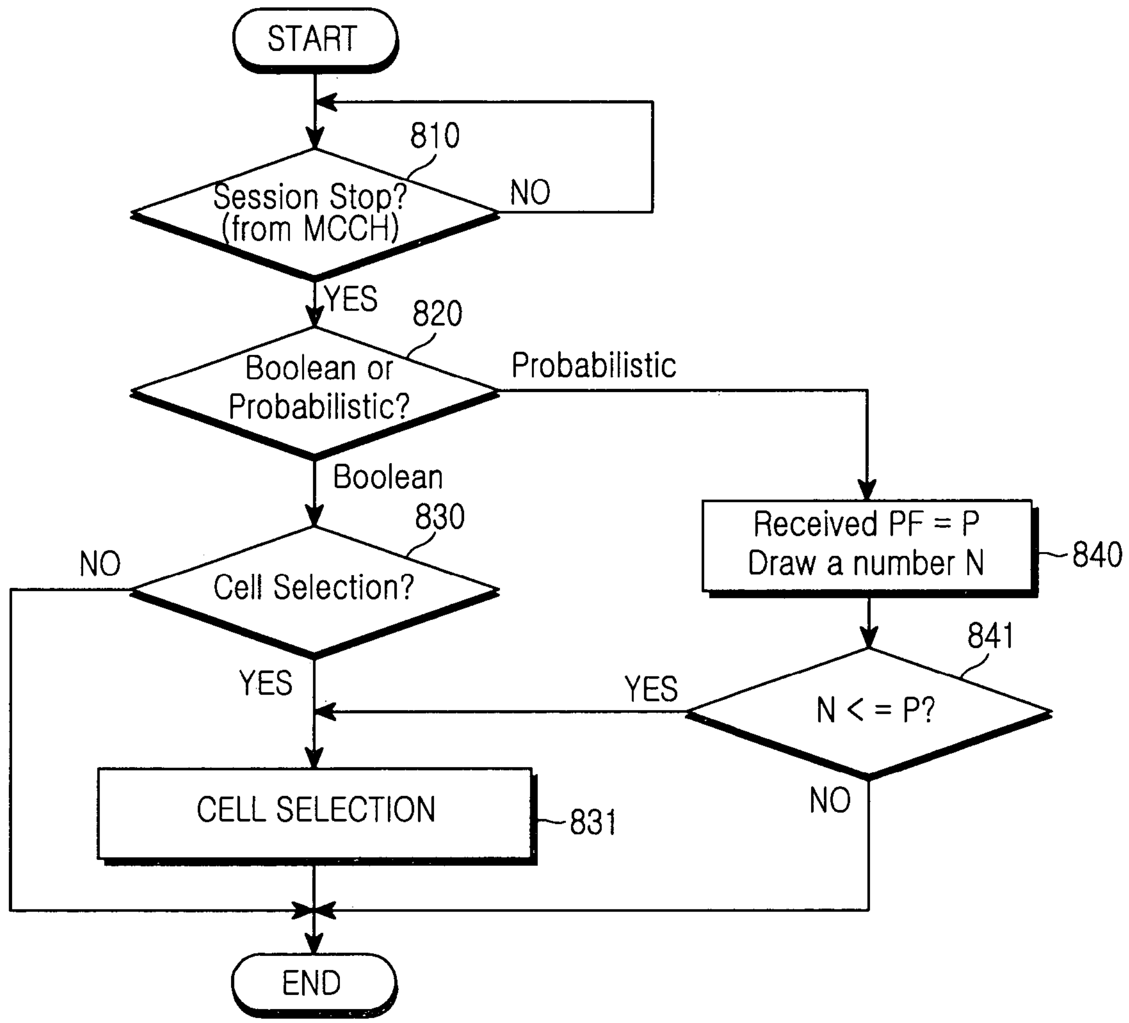
FIG. 8 is an exemplary flowchart illustrating an operation for receiving cell selection indication information in the UE in accordance with an exemplary embodiment of the present invention.

FIG. 8 is an exemplary flowchart illustrating an operation for receiving the cell selection indication information in the UE in accordance with the first exemplary embodiment of the present invention.

Referring to FIG. 8, the UE receives MCCH information comprising session stop information for a MBMS service while receiving the MBMS service in step 810. The UE obtains the cell selection indication information from the MCCH information and analyzes the cell selection indication information in step 820. When the cell selection indication information comprises a Boolean indicator for indicating True/False, the UE proceeds to step 830. When the cell selection indication information comprises a PF value, the UE proceeds to step 840.

When proceeding to step 830, the UE determines if the indicator indicates “True”. If the indicator indicates “True”, the UE proceeds to step 831 to perform the cell selection. Otherwise, the UE stops the operation and stays in the current cell. When proceeding to step 840, the UE stores a PF value, in other words, P, and randomly generates an integer N between 0 and a predefined MaxResolution value. In step 841, the UE compares the random value N with the value P. If the random value N is less than or equal to the value P, the UE proceeds to step 831. Otherwise, the UE stops the operation and stays in the current cell.

In accordance with an exemplary embodiment of the present invention, cell selection indication information is transmitted to UEs using a cell selection indication message serving as a RRC message using a control channel such as a dedicated control channel (DCCH) or a common control channel (CCCH).

Figure 9:
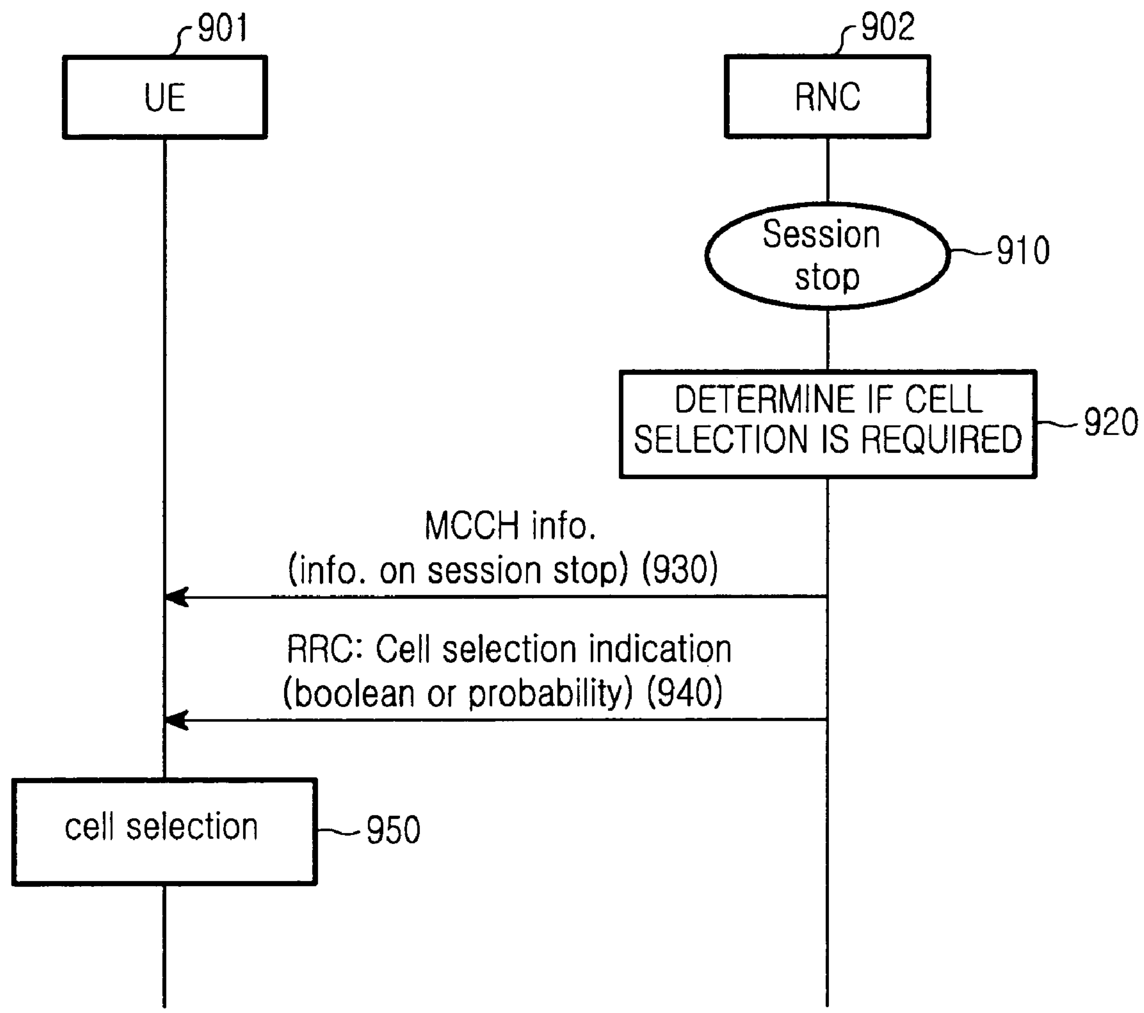
FIG. 9 is an exemplary message flow diagram illustrating a dispersion operation of a UE using a control channel in accordance with an exemplary embodiment of the present invention.

FIG. 9 is an exemplary message flow diagram illustrating a dispersion operation of a UE using a control channel in accordance with an exemplary embodiment of the present invention.

Referring to FIG. 9, a RNC 902 receives a session stop message for a MBMS service from a SGSN (not illustrated) in step 910. The RNC 902 determines if cell selection is required in UEs using or desiring to use the MBMS service in step 920. At this time, the RNC 902 determines a time until the next session of the MBMS service is started and load levels of PL and NPL cells, and determines if the cell selection is required.

In step 930, the RNC 902 transmits session stop information (in other words, a session stopped service list) for indicating a UE 901 that the session of the MBMS service has been stopped, through the MCCH carrying MCCH information. Then, the RNC 902 transfers, to the UE 901, a cell selection indication message comprising cell selection indication information indicating if the cell selection is required in step 940. The UE 901 performs the cell selection or stays in the current cell according to the cell selection indication information in step 950. At this time, when the cell selection is performed, the UE 901 returns to a NPL cell located before moving to a PL cell of the MBMS service or performs the cell selection on the basis of a measurement result obtained by measuring the intensity of a signal. For this, the UE can store previous frequency information.

The cell selection indication message is mapped to a specific MBMS service in which a session has been stopped, and is transmitted through the CCCH or DCCH. When the CCCH is used, the RNC gives an indication such that the UE can listen to the CCCH.

FIG. 10 is an exemplary table illustrating an example of a structure of a cell selection indication message in accordance with an exemplary embodiment of the present invention.

Referring to FIG. 10, the cell selection indication message comprises a TMGI serving as a service ID for an associated MBMS service and a cell selection indicator. The cell selection indication message can further comprise a session ID for identifying a session of the MBMS service. The cell selection indicator comprises the same indicator or PF as described above in relation to FIG. 6.

Figure 11:
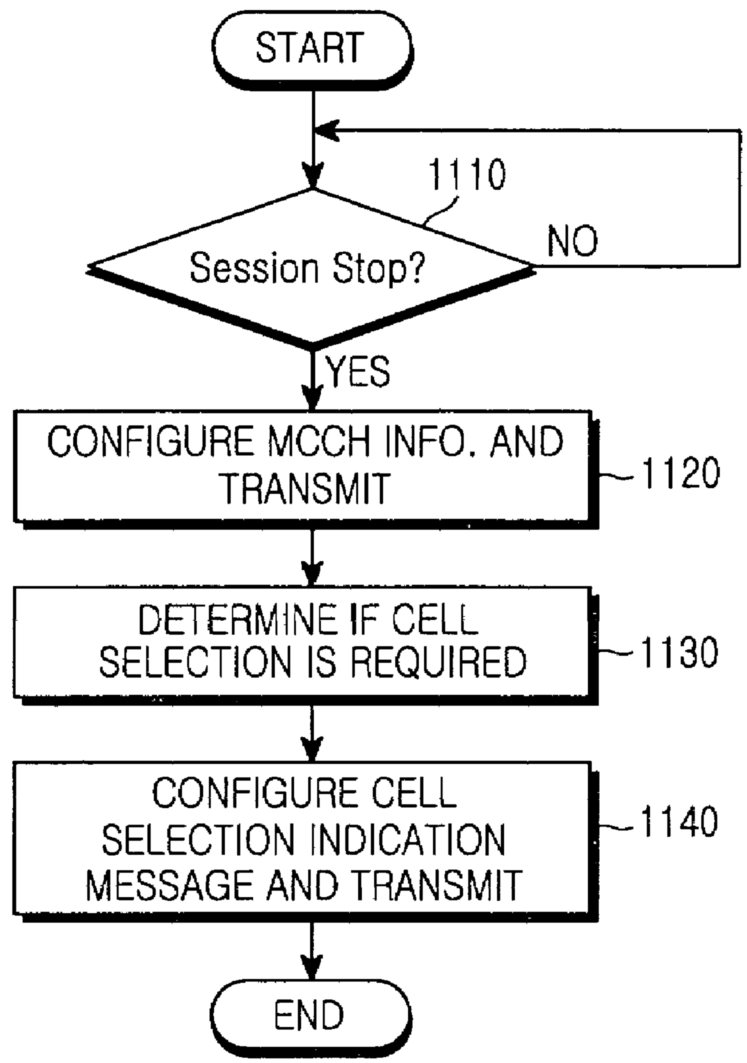
FIG. 11 is an exemplary flowchart illustrating an operation for transmitting the cell selection indication message illustrated in FIG. 10 according to an exemplary embodiment of the present invention.

FIG. 11 is an exemplary flowchart illustrating an operation for transmitting the cell selection indication message illustrated in FIG. 10. Whenever a session is stopped, the RNC sends information associated with cell selection to UEs.

Referring to FIG. 11, the RNC receives a session stop message for a MBMS service from the SGSN in step 1110. The RNC configures MCCH information comprising session stop information for the MBMS service and sends the MCCH information to the UEs through the MCCH in step 1120. The session stop information is a service ID of a stopped MBMS service. The RNC determines if cell selection is required, in other words, a dispersion operation is required in the UEs, in step 1130 along with step 1120. The RNC configures a cell selection indication message representing a result of the determination as illustrated in FIG. 10 and transmits the cell selection indication message to the UEs using the MBMS service through the DCCH or CCCH in step 1140.

FIG. 12 is an exemplary table illustrating an example of another structure of a cell selection indication message in accordance with an exemplary embodiment of the present invention. In the second embodiment, the cell selection indication message is transmitted from the RNC only when cell selection is required or not required according to an agreement set between the RNC and UE. Upon receiving session stop information through the MCCH, the UE determines if the cell selection indication message is received according to the agreement. The cell selection is performed only when the cell selection indication message is received or not received.

Referring to FIG. 12, the cell selection indication message basically comprises a TMGI serving as a service ID for identifying a MBMS service in which a session has been stopped, and can further comprise a session ID for identifying the session.

Figure 13:
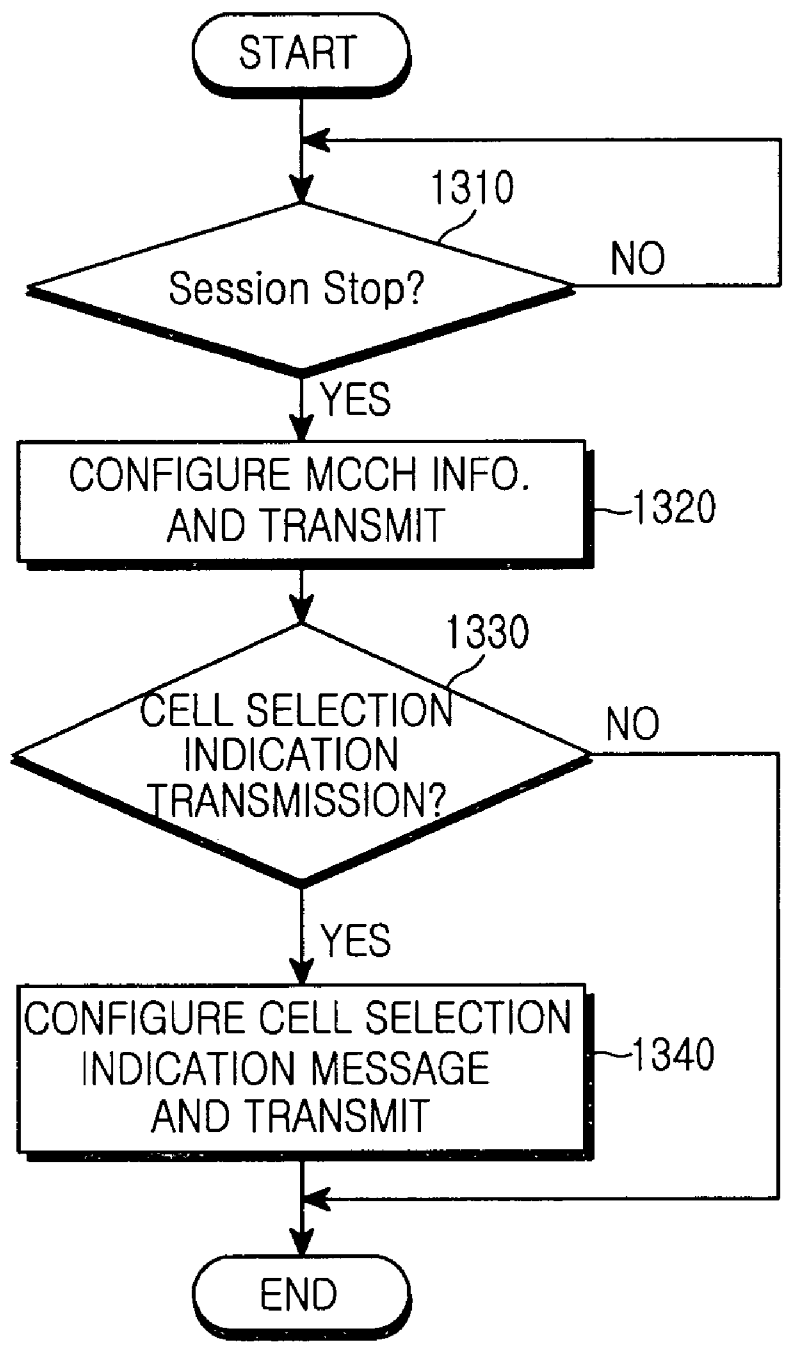
FIG. 13 is an exemplary flowchart illustrating an operation for transmitting the cell selection indication message illustrated in FIG. 12 according to an exemplary embodiment of the present invention.

FIG. 13 is an exemplary flowchart illustrating an operation for transmitting the cell selection indication message illustrated in FIG. 12. In an exemplary implementation of the present invention, when a session is stopped, the RNC transmits the cell selection indication message to UEs according to whether or not the cell selection is required.

Referring to FIG. 13, the RNC receives a session stop message for a MBMS service from the SGSN in step 1310. The RNC configures MCCH information comprising session stop information for the MBMS service and sends the MCCH information to the UEs through the MCCH in step 1320. The RNC determines if the cell selection indication message needs to be transmitted in step 1330 along with step 1320. In step 1340, the cell selection indication message is transmitted from the RNC when it is determined that cell selection is required or not required according to an agreement established between the RNC and UE. When it is determined that the cell selection indication message is not transmitted, the RNC stops the operation.

When the session is stopped and the RNC transmits the cell selection indication message as illustrated in FIG. 10, the UE operates as described above in relation to FIG. 8. That is, the UE only receives the cell selection indication message through the DCCH or CCCH and analyzes cell selection indication information comprised in the cell selection indication message in step 820. Then, the UE determines if cell selection is required according to the cell selection indication information.

Figure 14:
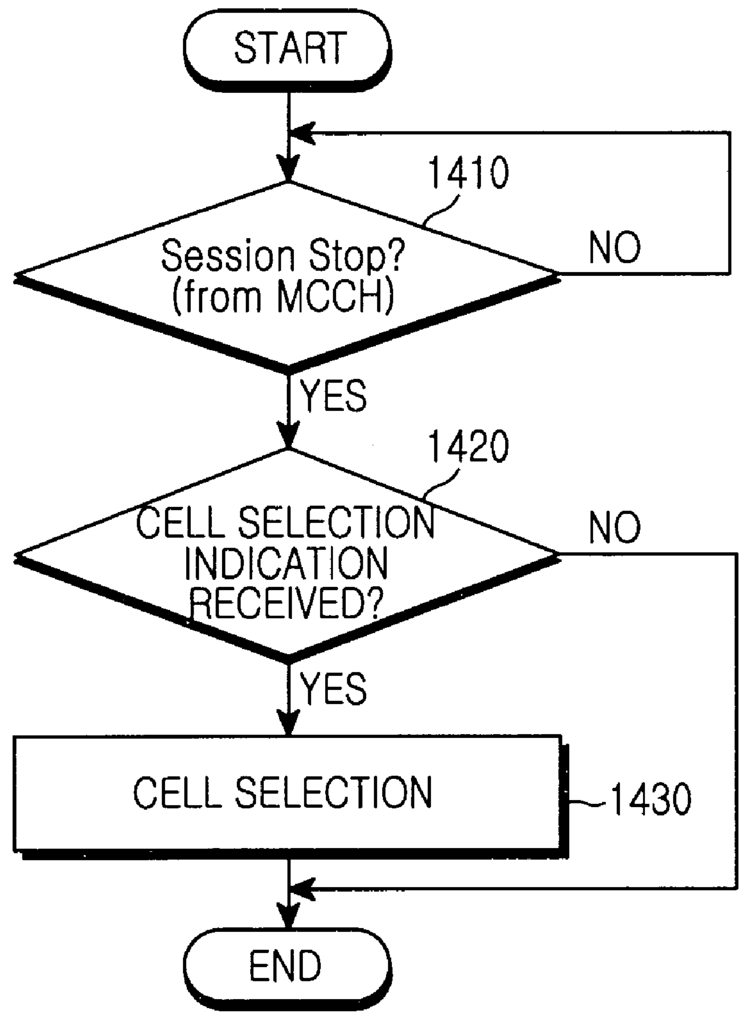
FIG. 14 is an exemplary flowchart illustrating an operation for receiving the cell selection indication information in the UE in accordance with an exemplary embodiment of the present invention.

When the session is stopped and the RNC optionally transmits the cell selection indication message as illustrated in FIG. 12, the UE operates as illustrated in FIG. 14. In FIG. 14, there is illustrated an exemplary operation for transmitting the cell selection indication message from the RNC such that the cell selection can be performed.

In FIG. 14, when session stop information is received through the MCCH in step 1410, the UE waits for the cell selection indication message to be received through the DCCH or CCCH in step 1420. If the cell selection indication message is received, the UE performs the cell selection in step 1430. Otherwise, the UE stays in the current cell.

In accordance with an exemplary embodiment of the present invention, the UE waits until a predetermined timer expires without moving to a NPL cell immediately after a session of a MBMS service is stopped in a PL cell when a cell selection indication is not made explicitly or according to probability. The timer is started when one session of the MBMS service is stopped and is stopped when the next session of the MBMS service is started. If the next session of the MBMS service is not started unit the timer times out, the UE performs cell selection.

Figure 15:
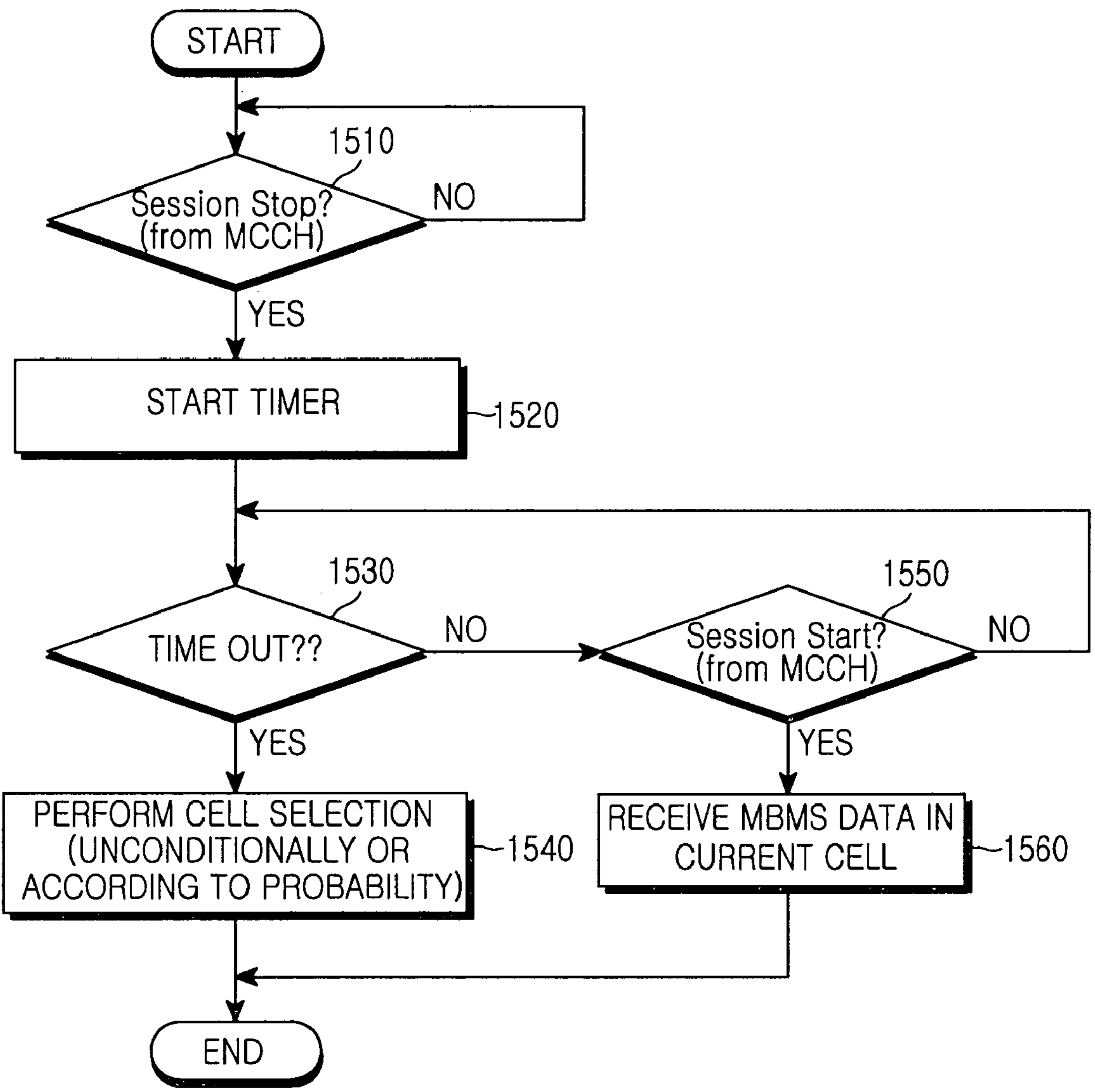
FIG. 15 is an exemplary flowchart illustrating the operation of the UE in accordance with an exemplary embodiment of the present invention.

FIG. 15 is an exemplary flowchart illustrating the operation of a UE in accordance with an exemplary embodiment of the present invention.

Referring to FIG. 15, the UE detects when a session of a MBMS service being received or to be received is stopped through the MCCH in step 1510. The UE starts a timer in which a predetermined time T is set in step 1520. The UE determines if the timer has expired in step 1530. If the timer has not expired, the UE proceeds to step 1550. However, if the timer has expired, the UE proceeds to step 1540.

In step 1540, the UE performs cell selection unconditionally or according to a probability value P. When the cell selection is performed, the UE 501 returns to a NPL cell where it was located in before moving to a PL cell of the MBMS service or performs the cell selection on the basis of a measurement result obtained by measuring the intensity of a signal. For this, the UE stores previous frequency information.

In step 1550, the UE determines if a new session of the MBMS service has been started through the MCCH. If the UE has received a message indicating that the new session has been started through the MCCH, the UE proceeds to step 1560 to stop the timer and receives the new session while staying in the current cell. A predetermined time T of the timer and a probability value P may be received in advance, or may be predetermined values preset in the UE. For example, the UE receives the predetermined value T and the probability value P from the RNC through the MCCH.

As is apparent from the above detailed description, exemplary embodiments of the present invention have the following representative effects.

In accordance with exemplary embodiments of the present invention, when the RNC detects that a session of a specific MBMS service has been stopped, the RNC determines a time until the next session of the MBMS service is started and load levels of PL and NPL cells, and transfers cell selection information to UEs, or when the UEs independently determine, cell congestion due to MBMS services using FLC is reduced and unnecessary signal transmission on radio is reduced. Therefore, the MBMS services can be efficiently provided.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for receiving a multimedia broadcast/multicast service (MBMS) service in a user equipment (UE) of a mobile communication system using a preferred frequency layer (PL) and one or more other frequency layers for the MBMS service, comprising:

receiving session stop information indicating that a session of the MBMS service has been stopped;

determining whether the UE stores previous frequency information representing at least one previous frequency layer after the session of the MBMS service has been stopped; and returning to the at least one previous frequency layer on the basis of the previous frequency information, if the UE stores the previous frequency information.

2. The method of claim 1, wherein if the UE does not store the previous frequency information, the UE stays in the PL.

3. An apparatus for receiving a multimedia broadcast/multicast service (MBMS) service in a user equipment (UE) of a mobile communication system using a preferred frequency layer (PL) and one or more other frequency layers for the MBMS service, comprising:

a receiver for receiving session stop information indicating that a session of the MBMS service has been stopped; and a controller for determining whether the UE stores previous frequency information representing at least one previous frequency layer after the session of the MBMS service has been stopped, and returning to the at least one previous frequency layer on the basis of the previous frequency information, if the UE stores the previous frequency information.

4. The apparatus of claim 3, wherein the controller controls so that the UE stays in the PL, if the UE does not store the previous frequency information.

* * * * *

UNITED STATES PATENT AND TRADEMARK OFFICE

CERTIFICATE OF CORRECTION

PATENT NO. : 7,636,332 B2
APPLICATION NO. : 11/225008
DATED : December 22, 2009
INVENTOR(S) : Kwak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 909 days.

Signed and Sealed this

Ninth Day of November, 2010

David J. Kappos

*Director of the United States Patent and Trademark Office*